United States Patent
Tsuji et al.

(10) Patent No.: US 9,139,662 B2
(45) Date of Patent: Sep. 22, 2015

(54) METHOD FOR PRODUCING CELLULOSE NANOFIBERS

(75) Inventors: Shiho Tsuji, Tokyo (JP); Masahiko Fukazawa, Tokyo (JP); Shoichi Miyawaki, Tokyo (JP); Tomoaki Koyanagi, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 71 days.

(21) Appl. No.: 14/008,682

(22) PCT Filed: Mar. 14, 2012

(86) PCT No.: PCT/JP2012/056557
§ 371 (c)(1),
(2), (4) Date: Oct. 28, 2013

(87) PCT Pub. No.: WO2012/132903
PCT Pub. Date: Oct. 4, 2012

(65) Prior Publication Data
US 2014/0053828 A1 Feb. 27, 2014

(30) Foreign Application Priority Data

Mar. 30, 2011 (JP) ................................. 2011-073987
Mar. 30, 2011 (JP) ................................. 2011-074023

(51) Int. Cl.
| | | |
|---|---|---|
| *C08B 15/00* | (2006.01) | |
| *C08B 15/04* | (2006.01) | |
| *D01F 1/02* | (2006.01) | |
| *D01F 2/02* | (2006.01) | |
| *D21H 11/20* | (2006.01) | |
| *D21C 9/00* | (2006.01) | |
| *D21H 11/18* | (2006.01) | |

(52) U.S. Cl.
CPC ................. *C08B 15/00* (2013.01); *C08B 15/04* (2013.01); *D01F 1/02* (2013.01); *D01F 2/02* (2013.01); *D21C 9/002* (2013.01); *D21C 9/007* (2013.01); *D21H 11/18* (2013.01); *D21H 11/20* (2013.01)

(58) Field of Classification Search
None
See application file for complete search history.

(56) References Cited

U.S. PATENT DOCUMENTS 8,287,692 B2 * 10/2012 Miyawaki et al. ................ 162/9

FOREIGN PATENT DOCUMENTS

| | | |
|---|---|---|
| EP | 907664 B1 * | 8/2000 |
| EP | 2 762 499 A1 | 8/2014 |
| JP | 2008-001728 | 1/2008 |
| JP | 2009161613 A * | 7/2009 |
| JP | 2010-235669 | 10/2010 |
| JP | 2010-235679 | 10/2010 |
| JP | 2010-235681 | 10/2010 |
| JP | 2010-275659 | 12/2010 |
| WO | WO 2010/116826 | 10/2010 |
| WO | WO 2011/089709 | 7/2011 |

OTHER PUBLICATIONS

Stelte et al, Preparation and Characterization of Cellulose Nanofibers from Two Commercial Hardwood and Softwood Pulps, 2009, Ind. Eng. Chem. Res., 48, 11211-11219.*
English translation of JP20009161613, 2009.*
English abstract of P 2008-001728A (Jan. 2008).
English abstract of JP 2010-235679 A (Oct. 2010).
Saito, T., et al., Cellulose Commun., 14(2), 62 (2007).
International Search Report for PCT/JP2012/056557, mailed May 1, 2012.
Extended European Search Report issued in EP Application No. 12764646.1 dated Sep. 5, 2014.

* cited by examiner

*Primary Examiner* — Melvin C Mayes
*Assistant Examiner* — Stefanie Cohen
(74) *Attorney, Agent, or Firm* — Nixon & Vanderhye P.C.

(57) ABSTRACT

Cellulose nanofibers are produced by means of a method comprising a step (A) of oxidizing a cellulosic starting material in the presence of an N-oxyl compound and a step (B) of forming the oxidized cellulosic starting material into nanofibers by defibrating the oxidized cellulosic starting material, and a step (C) of performing at least one selected from the following steps: a step (C-1) of treating the cellulosic starting material in water having a hydroxide ion concentration of 0.75 to 3.75 mol/L prior to performing the step (A); and a step (C-2) of subjecting the oxidized cellulosic starting material obtained from the step (A) to hydrolysis in an alkaline solution having a pH between 8 and 14 after performing the step (A) and prior to performing the step (B).

6 Claims, No Drawings

METHOD FOR PRODUCING CELLULOSE NANOFIBERS

This application is the U.S. national phase of International Application No. PCT/JP2012/056557 filed 14 Mar. 2012 which designated the U.S. and claims priority to JP Patent Application No. 2011-073987 filed 30 Mar. 2011 and JP Patent Application No. 2011-074023 filed 30 Mar. 2011, the entire contents of each of which are hereby incorporated by reference.

TECHNICAL FIELD

The present invention relates to a method for efficiently producing cellulose nanofibers with low energy.

BACKGROUND ART

When a cellulosic starting material is treated in the presence of 2,2,6,6-tetramethyl-1-piperidin-N-oxyradical (hereinafter "TEMPO") and sodium hypochlorite which is an inexpensive oxidizing agent, carboxyl groups can be introduced efficiently into the cellulose microfibril surface. It is known that when the cellulosic starting material into which the carboxyl groups have been introduced is treated with a mixer or the like in water, a high-viscosity and transparent aqueous dispersion of cellulose nanofibers can be obtained (Non-patent Document 1, Patent Documents 1 and 2).

Cellulose nanofibers are a novel water-dispersible material that is biodegradable. Since carboxyl groups are introduced in the surface of cellulose nanofibers by oxidation reaction, the quality of cellulose nanofibers can be modified using the carboxyl groups as base points. Further, since the cellulose nanofibers obtained by the method mentioned above are in the form of a dispersion liquid, the quality can also be modified by blending the cellulose nanofibers with various water-soluble polymers or forming a composite of the cellulose nanofibers with an organic and/or inorganic pigment. Furthermore, the cellulose nanofibers can also be formed into a sheet or fiber. These characteristics of cellulose nanofibers are expected to be of help in making highly functional products obtained by application of cellulose nanofibers as an environmentally recyclable material to highly functional packaging materials, transparent organic substrate materials, highly functional fibers, separation membranes, regenerative biomaterials and the like.

CITATION LIST

Patent Documents

Patent Document 1: JP 2008-001728 A
Patent Document 2: JP 2010-235679 A

Non-Patent Document

Non-patent Document 1: Saito, T., et al., Cellulose Commun., 14 (2), 62 (2007)

SUMMARY OF INVENTION

Technical Problem

In conventional methods for producing cellulose nanofibers, a dispersion liquid of a cellulosic starting material oxidized using TEMPO is treated with a mixer to defibrate the oxidized cellulosic starting material. However, there is the problem that the viscosity of the dispersion liquid markedly increases during the treatment, resulting in difficulty of efficient defibration treatment. In particular, a problem is that when the viscosity of the dispersion liquid is too high, dispersion progresses only around a mixer impeller, leading to non-uniform dispersion. For example, even when the concentration of the oxidized cellulosic starting material in the dispersion liquid is low, 0.3 to 0.5% (w/v), the B-type viscosity (60 rpm, 20° C.) is 800 to 4000 mPa·s, which is a high value, in some cases. Under these circumstances, the present inventors attempted a defibration treatment using a homogenizer having a higher ability for defibration and dispersion than a mixer. However, observation revealed that the following problems still arose: a cellulosic starting material significantly thickened in an early phase of dispersion, flowability decreased, and consumption of electric power required during dispersion treatment increased. There were also the problems that sufficient dispersion was impossible because of adhesion of cellulose nanofiber dispersion liquid to the inside of the apparatus and that the yield of the dispersion liquid lowered because it was difficult to perform a process such as removing the dispersion liquid from the apparatus.

In general, cellulose nanofibers are used for various applications in the form of a dispersion liquid. In particular, when the dispersion liquid is used as a liquid for coating, it is preferred that the concentration of cellulose nanofibers is high in a cellulose nanofiber dispersion liquid from the viewpoint of increasing the amount of cellulose nanofibers in coating films. For example, when a dispersion liquid containing a low concentration of cellulose nanofibers is coated on a substrate to form a film thereon, the frequency of coating is required to be increased, which reduces working efficiency. Hence, cellulose nanofibers that provide a high concentration of dispersion liquid are desirable; however, as described above, the viscosity increases as a result of an attempt to obtain a high concentration of a dispersion liquid and hence, production of a high concentration of a cellulose nanofiber dispersion liquid requires enormous energy.

There is also a demand for production of a highly transparent cellulose nanofiber dispersion liquid which has the potential to be used for optical applications.

In consideration of the foregoing, the present invention aims to provide a low-cost and efficient method by which a cellulose nanofiber dispersion liquid having superior flowability, i.e., low viscosity and preferably, high transparency can be produced with low energy.

Solution to Problem

As a result of extensive and intensive studies, the present inventors found that the aforementioned object can be achieved by a method for producing cellulose nanofibers comprising a step for oxidizing a cellulosic starting material using an N-oxyl compound such as TEMPO (a step A) and a step for defibration (a step B) and further comprising a step for treatment under alkaline conditions (a step C). This finding led to the completion of the present invention. More specifically, the aforementioned object is achieved by the following invention:

A method for producing cellulose nanofibers comprising the following steps:

(A) oxidizing a cellulosic starting material in the presence of an N-oxyl compound (a1) and a compound selected from the group consisting of bromides, iodides and mixtures thereof (a2), using an oxidizing agent (a3); and (B) forming the oxidized cellulosic starting material obtained in the step A into nanofibers by preparing a dispersion liquid comprising the oxidized cellulosic starting material and defibrating the starting material while dispersing the starting material in a dispersion medium, and the method further comprising the following step:

(C) performing a treatment under alkaline conditions, wherein the step C is at least one of the following steps:
(C-1) treating the cellulosic starting material in water having a hydroxide ion concentration of 0.75 to 3.75 mol/L before the step A; and
(C-2) subjecting the oxidized cellulosic starting material obtained in the step A to hydrolysis in an alkaline solution having a pH between 8 and 14 after the step A and before the step B.

Advantageous Effects of Invention

In accordance with the present invention, a cellulose nanofiber dispersion liquid having superior flowability, i.e., low viscosity and preferably, high transparency can be produced efficiently with low energy.

DESCRIPTION OF EMBODIMENTS

The present invention will be described in detail below. As used herein, "A to B" which indicates a numerical range means values ranging from A to B (both ends inclusive).

1. Production Method for Cellulose Nanofibers

The production method of the present invention comprises the step A of oxidizing a cellulosic starting material in the presence of an N-oxyl compound (a1) and a compound selected from the group consisting of bromides, iodides and mixtures thereof (a2), using an oxidizing agent (a3), and the step B of forming the oxidized cellulosic starting material obtained in the step A into nanofibers by preparing a dispersion liquid comprising the oxidized cellulosic starting material and defibrating the starting material while dispersing it in a dispersion medium, and the method further comprises the step C of performing a treatment under alkaline conditions.

1-1. Cellulosic Starting Material

The cellulosic starting material used in the present invention is not particularly limited, and the following materials can be used: kraft pulp or sulfite pulp of various wood origins; cellulose powder formed by pulverizing such pulp with a high-pressure homogenizer, a mill or the like; a microcrystalline cellulose powder formed by purifying such a material by chemical treatment such as acid hydrolysis; and the like. Cellulosic starting materials derived from plants such as kenaf, hemp, rice, bagasse and bamboo can also be used. However, if a large volume of lignin remains in cellulosic starting materials, it can inhibit oxidation reaction of the starting materials. Hence, in the present invention, it is preferable to use a cellulosic starting material obtained by a production method for chemical pulp. To further remove lignin, it is more preferable to subject the thus obtained cellulosic starting material to a known bleaching treatment.

As to a method for bleaching treatment, chlorination (C), chlorine dioxide bleaching (D), alkali extraction (E), hypochlorite bleaching (H), hydrogen peroxide bleaching (P), alkaline hydrogen peroxide treatment stage (Ep), alkaline hydrogen peroxide and oxygen treatment stage (Eop), ozone treatment (Z), chelate treatment (Q) and the like may be combined in a sequence such as C/D-E-H-D, Z-E-D-P, Z/D-Ep-D, Z/D-Ep-D-P, D-Ep-D, D-Ep-D-P, D-Ep-P-D, Z-Eop-D-D, Z/D-Eop-D or Z/D-Eop-D-E-D. The symbol "/" in the sequences means that the treatments shown in front of and behind the symbol "/" are performed continuously without washing. It is preferred that the amount of lignin in the cellulosic starting material is small and it is more preferred that cellulosic starting materials obtained by pulping treatment and bleaching treatment (bleached kraft pulp, bleached sulfite pulp) have a brightness (ISO 2470) of 80% or more.

It is also preferred to use cellulose powder, microcrystalline cellulose powder, or bleached kraft pulp or bleached sulfite pulp which has a brightness (ISO 2470) of 80% or more, in terms of mass production and cost. Use of cellulose powder or microcrystalline cellulose powder is especially preferred since cellulose nanofibers that provide dispersion liquid having lower viscosity even in high concentration can be produced. Hardwood cellulosic starting materials (that is, broadleaf tree-derived cellulosic starting materials) are also preferred since cellulose nanofibers that provide low-viscosity dispersion liquid with low electric consumption can be produced.

The cellulose powder is a rod-like particle consisting of microcrystalline cellulose which is obtained by an acid hydrolysis treatment to remove amorphous region from wood pulp, followed by pulverizing and sieving. In the cellulose powder, the degree of polymerization of cellulose is about 100 to 500, the crystallinity of the cellulose powder measured by X-ray diffraction is 70 to 90%, and the volume average particle size measured with an apparatus for measurement of laser diffraction particle size distribution is preferably 100 μm or less, more preferably 50 μm or less. When the volume average particle size is 100 μm or less, a cellulose nanofiber dispersion liquid superior in flowability can be obtained. As the cellulose powder used in the present invention, for example, a rod-like crystalline cellulose powder having a certain particle size distribution which is obtained by subjecting well-selected pulp to acid hydrolysis to obtain an undecomposed residue and purifying, drying, pulverizing and sieving the residue may be used. Alternatively, a commercially available product such as KC FLOCK® (Nippon Paper Chemicals Co., Ltd.), CEOLUS™ (Asahi Kasei Chemicals Corporation), or AVICEL® (FMC Corporation) may be used.

1-2. Step A

In the step A, a cellulosic starting material is oxidized using an oxidizing agent (a3) in the presence of an N-oxyl compound (a1) and a compound selected from the group consisting of bromides, iodides and mixtures thereof (a2).

(1) N-oxyl Compound (a1)

The N-oxyl compound is a compound that can generate a nitroxyl radical. As the N-oxyl compound used in the present invention, any compound may be used as long as it promotes desired oxidation reaction. Examples of the N-oxyl compound used in the present invention include compounds represented by the following general formula (Formula 1):

[Formula 1]

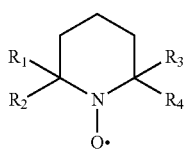

Formula 1 wherein $R_1$ to $R_4$, which may be the same or different, each represent an alkyl group having about 1 to 4 carbon atoms.

Among the substances represented by Formula 1, 2,2,6,6-tetramethyl-1-piperidin-oxyradical (hereinafter "TEMPO") is preferred. N-oxyl compounds represented by any one of Formulas 2 to 4 below, i.e., 4-hydroxy TEMPO derivatives to which appropriate hydrophobicity has been imparted by etherification of the hydroxyl group of 4-hydroxy TEMPO with an alcohol or esterification with carboxylic acid or sulfonic acid, or 4-acetamide TEMPO which is represented by Formula 5 below, to which appropriate hydrophobicity has been imparted by acetylation of the amino group of 4-amino TEMPO, are particularly preferred since they are inexpensive and enable uniform oxidized cellulose to be obtained.

[Formula 2]

Formula 2

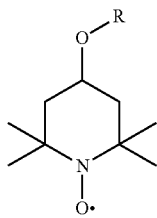

Formula 3

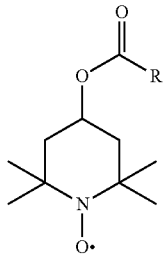

Formula 4

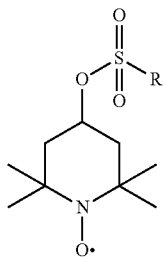

Formula 5

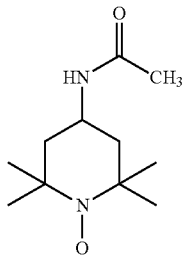

In Formulas 2 to 4, R is a straight or branched carbon chain having 4 or less carbon atoms.

Further, N-oxyl compounds represented by Formula 6 below, i.e., aza-adamantane type nitroxyl radicals, are preferred since they can oxidize a cellulosic starting material efficiently within a short reaction time and enable production of a cellulose nanofiber having a high degree of polymerization.

[Formula 3]

Formula 6

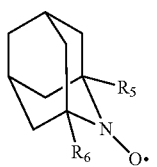

In Formula 6, $R_5$ and $R_6$, which may be the same or different, each represent a hydrogen atom or a $C_1$-$C_6$ straight or branched alkyl group.

The amount of an N-oxyl compound used is not particularly limited as long as it is a catalytic amount which can promote oxidation reaction so that the cellulosic starting material can be formed into nanofibers. For example, the amount is preferably 0.01 to 10 mmol, more preferably 0.01 to 1 mmol, even more preferably 0.05 to 0.5 mmol, relative to 1 g (bone dry weight) of the cellulosic starting material.

(2) Bromide or Iodide (a2)

The bromide is a bromine-containing compound and examples include alkali metal bromides which can be dissociated in water and ionized. The iodide is an iodine-containing compound and examples include alkali metal iodides. The amount of the bromide or iodide used may be selected within a range which can promote the oxidation reaction. For example, the total amount of the bromide or the iodide is preferably 0.1 to 100 mmol, more preferably 0.1 to 10 mmol, even more preferably 0.5 to 5 mmol, relative to 1 g (bone dry weight) of the cellulosic starting material.

(3) Oxidizing Agent (a3)

As the oxidizing agent used in the oxidation of the cellulosic starting material, a known oxidizing agent may be used and, for example, a halogen, a hypohalogenous acid, a halogenous acid, a perhalogenic acid, or a salt thereof, a halogen oxide, or a peroxide may be used. Among them, in terms of cost, a particularly suitable oxidizing agent is sodium hypochlorite, which is now most widely used in industrial processes, inexpensive, and less harmful to the environment. The appropriate amount of the oxidizing agent used may be selected within a range which can promote the oxidation reaction. For example, the amount is about 0.5 to 500 mmol, preferably about 0.5 to 50 mmol, more preferably about 2.5 to 25 mmol, even more preferably about 5 to 20 mmol, relative to 1 g (bone dry weight) of the cellulosic starting material.

(4) Conditions for Oxidation Reaction of Cellulosic Starting Material

In the oxidation step (step A), it is preferable to use water as a reaction medium to suppress a side reaction. In the step A, it is possible to proceed with a reaction efficiently even under relatively mild conditions. Hence, the reaction temperature may be a room temperature of about 15 to 30° C. As the reaction proceeds, carboxyl groups are generated in cellulose and hence, a decline in the pH of the reaction mixture is observed. To proceed with the oxidation reaction efficiently, it is preferable to maintain the pH of the reaction mixture at about pH 9 to 12, preferably about pH 10 to 11, by adding an alkaline solution such as an aqueous sodium hydroxide solution. The reaction medium is preferably water in terms of handleability, less tendency to cause a side reaction, and the like. The reaction time in the oxidation reaction may be set as appropriate according to the degree of the progression of oxidation and is generally 0.5 to 6 hours, for example, about 0.5 to 4 hours. However, if the step C-1 which is described later is performed, the oxidation time can be reduced and hence, the reaction time is preferably at least 30 minutes to 120 minutes, more preferably 30 to 100 minutes, even more preferably 30 to 70 minutes.

The oxidation reaction may be performed in two stages. For example, oxidized cellulose obtained by separation through filtration after completion of reaction in the first stage is oxidized again under the same or different reaction conditions, and this oxidation enables efficient introduction of carboxyl groups into the cellulosic starting material and promotion of the oxidation of the cellulosic starting material, without reaction inhibition caused by salts as a by-product of the reaction in the first stage.

In this step, it is preferable to set conditions such that the amount of the carboxyl groups contained in the oxidized cellulosic starting material is 1.0 mmol/g or more relative to the bone dry mass of the cellulosic starting material. In this case, the amount of the carboxyl groups is more preferably 1.0 to 3.0 mmol/g, even more preferably 1.4 to 3.0 mmol/g, particularly preferably 1.5 to 2.5 mmol/g. The amount of the carboxyl groups may be adjusted by a means such as adjustment of the oxidation reaction time, the oxidation reaction temperature, the pH during the oxidation reaction, and the addition amounts of the N-oxyl compound, bromide, iodide, and oxidizing agent.

The oxidized cellulosic starting material obtained in the step A is preferably washed from the viewpoints of performing the subsequent step B (or the step C-2, if the step is performed) efficiently, avoiding a side reaction, and the like.

1-3. Step B

In the step B, the oxidized cellulosic starting material obtained in the step A (or the step C-2, if the step is performed) is formed into nanofibers by preparing a dispersion liquid in which the oxidized cellulosic starting material is dispersed and defibrating the starting material while dispersing it in a dispersion medium. The phrase "to form into nanofibers" means processing the cellulosic starting material into cellulose nanofibers which are single microfibrils of cellulose with a width of about 2 to 5 nm and a length of about 100 to 5000 nm, preferably a length of about 1 to 5 μm. The dispersion liquid is a liquid in which the oxidized cellulosic starting material is dispersed in a dispersion medium. The dispersion medium is preferably water in terms of handleability. To defibrate the oxidized cellulosic starting material while dispersing it in a dispersion medium, it is preferable to apply strong shear force to the dispersion liquid using an apparatus such as a high-speed rotation type apparatus, a colloid mill type apparatus, a high pressure type apparatus, a roll mill type apparatus, or an ultrasound type apparatus. It is particularly preferable to use a wet high pressure or ultrahigh pressure homogenizer that can apply to the dispersion liquid a pressure of 50 MPa or higher and strong shear force. The aforementioned pressure is more preferably 100 MPa or higher, even more preferably 140 MPa or higher. By this treatment, the cellulosic starting material obtained in the step A is defibrated and cellulose nanofibers are formed and dispersed in a dispersion medium.

The concentration of the oxidized cellulosic starting material in the dispersion liquid which is subjected to the defibration is preferably 0.3% (w/v) or more. It is more preferably 1 to 50% (w/v). Especially if the step C-1 which is described later is performed, the concentration is preferably 1 to 2% (w/v), more preferably 3 to 5% (w/v). Especially if the step C-2 which is described later is performed, the concentration is more preferably 2 to 10% (w/v) since the viscosity of the system does not increase during the defibration even when the concentration of the oxidized cellulosic starting material is high.

1-4. Step C

The present invention includes the step C of performing a treatment under alkaline conditions, in addition to the steps A and B. The step C includes at least one of the following steps:

the step C-1 of treating the cellulosic starting material in water having a hydroxide ion concentration of 0.75 to 3.75 mol/L before the step A; and the step C-2 of subjecting the oxidized cellulosic starting material obtained in the step A to hydrolysis in an alkaline solution having a pH between 8 and 14 after the step A and before the step B.

(1) Step C-1

In the step C-1, which is a step performed before the step A, the cellulosic starting material is treated in water having a hydroxide ion concentration of 0.75 to 3.75 mol/L. Hereinafter, this treatment is also referred to simply as "the alkali treatment". The alkali treatment may be performed by dispersing the cellulosic starting material in water, adding an alkali to the aqueous dispersion to adjust the hydroxide ion concentration in water to a concentration falling within the aforementioned range, and stirring the reaction mixture. Alternatively, the alkali treatment may be performed by dispersing the cellulosic starting material in water containing a preliminarily adjusted concentration of hydroxide ions.

Through the alkali treatment, cellulose nanofibers that provide a dispersion liquid having superior transparency and low viscosity can be produced efficiently. It is deemed that the mechanism is as described below.

In general, in a cellulosic starting material, the cellulose molecules are bonded relatively tightly via hydrogen bonds and so are the cellulose fibers. When a cellulosic starting material is treated with an alkali, it is swollen, the hydrogen bonds are weakened, and somewhat large voids are formed between the cellulose molecules and between the cellulose fibers. Through the voids, the oxidizing agent used in the subsequent step A infiltrates more easily, which promotes the oxidation of the cellulosic starting material. In particular, when bleached kraft pulp or bleached sulfite pulp is used as a cellulosic starting material, hemicelluloses which cover the cellulose microfibril surface are eluted with the alkali. This results in the exposure of the microfibril surface and promotes the oxidation in the subsequent step A. As a result, the oxidation reactivity of the cellulosic starting material is enhanced, the oxidation reaction proceeds within a short time, and many carboxyl groups are introduced. When the amount of the carboxyl groups increases in that way, the oxidized cellulosic starting material is more easily defibrated and dispersed in a dispersion medium, enhancing nano-dispersibility. In consequence, the transparency of the dispersion liquid of cellulose nanofibers increases. Further, since the oxidation reactivity increases in the step A, carboxyl groups are generated and the pH decreases locally. At the locations, hypochlorous acid is generated from sodium hypochlorite contained in the reaction mixture. Hypochlorous acid oxidizes and decomposes cellulose and this promotes the decrease in the degree of polymerization. As a result, the viscosity of the cellulose nanofiber dispersion liquid markedly lowers.

Hence, it is preferred that each condition in the step C-1 is selected to maximize the aforementioned effects. The alkali that can be used in the step C-1 is not particularly limited as long as it is water-soluble, and examples include inorganic alkalis such as sodium hydroxide, potassium hydroxide, calcium hydroxide, and sodium carbonate, organic alkalis such as tetramethyl ammonium hydroxide and tetraethyl ammonium hydroxide, and the like. Among them, sodium hydroxide, which is easy to obtain and relatively inexpensive, is preferred. An aqueous solution containing a plurality of alkalis and other components, such as white liquor or green liquor generated in a pulp mill, may also be used.

The hydroxide ion concentration in water is 0.75 to 3.75 mol/L, preferably 1.25 to 2.5 mol/L. When the hydroxide ion concentration exceeds 3.75 mol/L, alkali is excessive, which results in the formation of the cellulosic starting material into markedly short fibers after the oxidation reaction in the subsequent step A and makes washing difficult. The condition where the hydroxide ion concentration exceeds 3.75 mol/L is a general condition for mercerizing a cellulosic starting material to produce carboxymethylcellulose (the sodium hydroxide concentration is 15 mass % or more); hence, the majority of the cellulosic starting material is mercerized to generate carboxymethylcellulose. The mercerized starting material is changed into polycellouronic acid by the oxidation reaction in the subsequent step A and dissolved in water and no cellulose nanofibers are generated. In contrast, when the hydroxide ion concentration falls below 0.75 mol/L, the alkali concentration is low and hemicelluloses are poorly removed. It is to be noted that the hydroxide ion concentrations in alkali extraction (E), alkaline hydrogen peroxide treatment stage (Ep) and alkaline hydrogen peroxide and oxygen treatment stage (Eop), in pulp bleaching, are about 0.01 to 0.08 mol/L, which are differentiated from the alkali treatment in the step C-1.

The alkali treatment may be performed under atmospheric pressure, under pressure or under reduced pressure. The treatment temperature is preferably 0 to 100° C., more preferably 10 to 60° C., even more preferably 20 to 40° C. The treatment time is preferably 5 minutes to 24 hours, more preferably 15 minutes to 12 hours, even more preferably 30 minutes to 6 hours. The concentration of the cellulosic starting material in the reaction mixture is preferably 0.1 to 50 mass %, more preferably 1 to 30 mass %, even more preferably 2 to 20 mass %.

From the viewpoint of avoiding a side reaction or the like in the subsequent step A, it is preferable to neutralize and wash the cellulosic starting material treated in the step C-1.

(2) Step C-2

In the step C-2, which is a step performed after the step A and before the step B, the oxidized cellulosic starting material obtained in the step A (hereinafter also referred to simply as "the oxidized cellulosic starting material") is hydrolyzed in an alkaline solution having a pH between 8 and 14.

To suppress a side reaction, it is preferable to use water as a reaction medium in the step C-2.

In the step C-2, it is preferable to use an oxidizing agent or a reducing agent, as an auxiliary agent. The oxidizing agent or reducing agent that can be used is one that has activity in an alkaline range of pH 8 to 14. Examples of the oxidizing agent include oxygen, ozone, hydrogen peroxide and hypochlorite, and a combination of two or more of these oxidizing agents may be used. It is to be noted that when an oxidizing agent that generates radicals, such as ozone, is used, the problem can arise that the hydrolyzed oxidized cellulosic starting material is colored because of the generated radicals. Hence, as the oxidizing agent used in the present invention, one less likely to generate radicals, such as oxygen, hydrogen peroxide or hypochlorite, is preferred and especially, hydrogen peroxide is preferred from the viewpoint of preventing coloration. It is more preferred that those agents are not used in combination with an oxidizing agent that generates radicals, such as ozone, and it is even more preferred that hydrogen peroxide is used alone. Examples of the reducing agent used in the present invention include sodium boron hydride, hydrosulfite and sulfite, and a combination of two or more of these reducing agents may be used. In terms of reaction efficiency, the amount of the auxiliary agent added is preferably 0.1 to 10 mass %, more preferably 0.3 to 5 mass %, even more preferably 0.5 to 2 mass %, relative to the bone-dry oxidized cellulosic starting material.

The pH of the reaction mixture in the hydrolysis reaction is preferably 8 to 14, more preferably 9 to 13, even more preferably 10 to 12. When the pH is less than 8, sufficient hydrolysis does not occur, which potentially leads to no reduction in the energy required in the step B. When the pH is more than 14, hydrolysis proceeds but the problem can arise that the hydrolyzed oxidized cellulosic starting material is colored. The alkali used for pH adjustment may be water-soluble and sodium hydroxide is best in terms of production cost. The temperature is preferably 40 to 120° C., more preferably 50 to 100° C., even more preferably 60 to 90° C., in terms of reaction efficiency. When the temperature is lower, sufficient hydrolysis does not occur, which potentially leads to no reduction in the energy required in the step B. In contrast, when the temperature is higher, hydrolysis proceeds but the problem can arise that the hydrolyzed oxidized cellulosic starting material is colored. The reaction time for hydrolysis is preferably 0.5 to 24 hours, more preferably 1 to 10 hours, even more preferably 2 to 6 hours. In terms of reaction efficiency, the concentration of the oxidized cellulosic starting material in the reaction mixture is preferably 1 to 20 mass %, more preferably 3 to 15 mass %, even more preferably 5 to 10 mass %.

By hydrolysis in an alkaline solution of pH 8 to 14, the energy required for defibration in the step B can be reduced. The reason is inferred as follows: carboxyl groups are scattered in the amorphous region of the cellulosic starting material oxidized using an N-oxyl compound, and the hydrogen at the C6-position at which the carboxyl group exists lacks electric charge since the electron of the hydrogen atom has been attracted by the carboxyl group. Hence, under alkaline conditions of pH 8 to 14, the hydrogen is easily withdrawn by a hydroxide ion. As a result, cleavage reaction of glycoside bonds due to β-elimination proceeds and the oxidized cellulosic starting material is formed into short fibers. By allowing the fiber length of the oxidized cellulosic starting material to be shortened in that way, the viscosity of a dispersion liquid containing the starting material can be lowered. In consequence, the energy required for defibration in the step B is reduced. It is to be noted that when the cellulosic starting material is hydrolyzed merely under alkaline conditions, the starting material is likely to take on a yellow color. It is deemed that the cause is generation of double bonds during β-elimination. To cope with this problem, an oxidizing agent or a reducing agent is used in the hydrolysis under alkaline conditions of pH 8 to 14 and consequently, the double bonds can be oxidized or reduced to be removed and coloration can be suppressed. In particular, when hydrogen peroxide or the like which is less likely to generate radicals is used as an oxidizing agent, coloration is less likely to occur.

1-5. Viscosity-Reducing Treatment

To further reduce the energy required for defibration and enhance handleability through reduction in the viscosity of a cellulose nanofiber dispersion liquid prepared, the oxidized cellulosic starting material obtained in the step A (or the hydrolyzed oxidized cellulosic starting material obtained in the step C-2) may be subjected to a treatment for reducing the viscosity by a method different from that of the step C, between the steps A and B (between the steps A and C-2 or between the steps C-2 and B, if the step C-2 is performed). The viscosity-reducing treatment is a treatment for further cutting the cellulose chains of the oxidized cellulosic starting material into pieces of appropriate length (formation of the cellulose chains into short fibers). Given that dispersion liquid prepared using the thus treated starting material has low viscosity, the viscosity-reducing treatment can also be regarded as a treatment for obtaining a cellulosic starting material that provides low-viscosity dispersion liquid. The viscosity-reducing treatment may be a treatment that enables the reduction in the viscosity of the oxidized cellulosic starting material, and it is, for example, a treatment of irradiating the oxidized cellulosic starting material with ultraviolet rays, a treatment of oxidizing and decomposing the same starting material using hydrogen peroxide and ozone, a treatment of hydrolyzing the same starting material with an acid, or a combination of these treatments.

(1) Ultraviolet Radiation

When the oxidized cellulosic starting material is irradiated with ultraviolet rays to perform the viscosity-reducing treatment, the wavelength of the ultraviolet rays is preferably 100 to 400 nm, more preferably 100 to 300 nm. Especially, ultraviolet rays of wavelength 135 to 260 nm are preferred since they can act directly on cellulose or hemicellulose to reduce the molecular weight and form the oxidized cellulosic starting material into short fibers.

As a light source for the ultraviolet radiation, one that can irradiate light in a wavelength range of 100 to 400 nm may be used. Specific examples include a xenon short arc lamp, an ultrahigh pressure mercury lamp, a high pressure mercury lamp, a low pressure mercury lamp, a deuterium lamp, a metal halide lamp, and the like. These light sources may be used singly or in combination of any two or more. In particular, when a combination of a plurality of light sources having different wavelength characteristics is used, ultraviolet rays of different wavelengths can be irradiated simultaneously, thereby increasing dissociation sites of cellulose chains or hemicellulose chains; hence, formation into short fibers can be promoted.

As a vessel in which the oxidized cellulosic starting material is placed during the ultraviolet irradiation, for example, a vessel made of hard glass may be used when ultraviolet rays of a wavelength longer than 300 nm are used. On the other hand, when ultraviolet rays of a wavelength shorter than 300 nm are used, it is preferable to use a vessel made of quartz glass which transmits more ultraviolet rays. In the vessel, a material of the part that is not involved in the reaction with ultraviolet rays may be selected as appropriate from materials less likely to be deteriorated in reaction to the wavelength of ultraviolet rays.

To proceed with the reaction efficiently, it is preferable to prepare a dispersion liquid by dispersing the oxidized cellulosic starting material in a dispersion medium and irradiate the dispersion liquid with ultraviolet rays. The dispersion medium is preferably water from the viewpoints of suppressing a side reaction and the like. The concentration of the oxidized cellulosic starting material in the dispersion liquid is preferably 0.1 mass % or higher from the viewpoint of enhancing energy efficiency. Further, the concentration is preferably 12 mass % or lower to maintain good flowability of the oxidized cellulosic starting material in an ultraviolet irradiator and enhance reaction efficiency. Hence, the concentration of the oxidized cellulosic starting material in the dispersion liquid is preferably 0.1 to 12 mass %, more preferably 0.5 to 5 mass %, even more preferably 1 to 3 mass %.

The reaction temperature is preferably 20° C. or higher in terms of reaction efficiency. Meanwhile, when the temperature is too high, the oxidized cellulosic starting material can be deteriorated or the pressure in a reactor apparatus can exceed atmospheric pressure; hence, the reaction temperature is preferably 95° C. or lower. Thus, the reaction temperature is preferably 20 to 95° C., more preferably 20 to 80° C., even more preferably 20 to 50° C. Further, when the reaction temperature falls within the range, there is the advantage that it is unnecessary to take pressure resistance into consideration in apparatus designing. The pH of the system in the reaction is not limited, but the neutral range, for example, about pH 6.0 to 8.0, is preferred in light of simplification of the process.

The level of the ultraviolet irradiation may be set arbitrarily by a means such as adjusting the residence time of the oxidized cellulosic starting material in an irradiation reactor or adjusting the amount of energy of an irradiation light source. The amount of ultraviolet rays with which the oxidized cellulosic starting material is irradiated may be adjusted by, for example, diluting with water or the like the dispersion liquid of the oxidized cellulosic starting material in an irradiation apparatus or diluting the dispersion liquid by blowing air or an inert gas such as nitrogen into the dispersion liquid. These conditions are selected as appropriate to obtain desired values of quality of the treated starting material (e.g., fiber length, polymerization degree of cellulose).

It is preferable to perform the ultraviolet irradiation treatment in the presence of an auxiliary agent such as oxygen, ozone or a peroxide (e.g., hydrogen peroxide, peracetic acid, sodium percarbonate, sodium perborate), since the efficiency of photo-oxidation reaction can be enhanced. Especially, in the case of irradiation with ultraviolet rays in a wavelength range of 135 to 242 nm, ozone is generated from oxygen in air which is present generally in a vapor phase area near the light source, and it is preferable to use the ozone as an auxiliary agent. In the present invention, while air is continuously supplied to the area near the light source, ozone generated is continuously withdrawn and the ozone thus withdrawn is injected into the oxidized cellulosic starting material; in consequence, ozone can be utilized as an auxiliary agent in the photo-oxidation reaction without supplying ozone from the outside of the system. Moreover, by supplying oxygen to the vapor phase area near the light source, more ozone can be generated in the system. In this manner, ozone generated secondarily in the ultraviolet irradiation reactor can be utilized in the present invention.

The ultraviolet irradiation treatment may be repeated plural times. The number of the repetitions may be set as appropriate according to the quality of the treated starting material, the relation with post-treatment such as bleaching, and the like. For example, ultraviolet rays of 100 to 400 nm, preferably 135 to 260 nm, may be irradiated 1 to 10 times, preferably about 2 to 5 times. In this case, the irradiation time is preferably 0.5 to 10 hours each time, more preferably 0.5 to 3 hours each time.

(2) Oxidative Decomposition Using Hydrogen Peroxide and Ozone

Ozone used in this treatment may be generated by a known method in an ozone generator using air or oxygen as a starting material. As described above, to perform an oxidation reaction efficiently, it is preferred that a dispersion liquid obtained by dispersing the oxidized cellulosic starting material in a dispersion medium such as water is used for the reaction. The amount (mass) of ozone used in the present invention is preferably 0.1 to 3 times larger than the bone dry mass of the oxidized cellulosic starting material. When the amount of ozone used is at least 0.1 time larger than the bone dry mass of the oxidized cellulosic starting material, the amorphous region of cellulose can be decomposed sufficiently, which enables significant reduction in the energy required for the defibration and dispersion treatments in the step B. Meanwhile, when the amount of ozone used is excessively large, cellulose can be decomposed excessively, but when the amount of use is not more than 3 times larger than the bone dry mass of the oxidized cellulosic starting material, excessive decomposition can be inhibited. The amount of ozone used is more preferably 0.3 to 2.5 times, even more preferably 0.5 to 1.5 times larger than the bone dry mass of the oxidized cellulosic starting material.

The amount (mass) of hydrogen peroxide used is preferably 0.001 to 1.5 times larger than the bone dry mass of the oxidized cellulosic starting material. When hydrogen peroxide is used in an amount that is at least 0.001 time larger than the bone dry mass of the oxidized cellulosic starting material, synergistic action of ozone and hydrogen peroxide is exerted, making an efficient reaction possible. Meanwhile, for the decomposition of the oxidized cellulosic starting material, it is sufficient to use hydrogen peroxide in an amount that is not more than about 1.5 times larger than the bone dry mass of the oxidized cellulosic starting material, and use of hydrogen peroxide in a larger amount leads to cost increase. The amount of hydrogen peroxide used is more preferably 0.1 to 1.0 time larger than the bone dry mass of the oxidized cellulosic starting material.

In terms of reaction efficiency, the pH of the system in the oxidative decomposition treatment using ozone and hydrogen peroxide is preferably 2 to 12, more preferably 4 to 10, even more preferably 6 to 8. The temperature is preferably 10 to 90° C., more preferably 20 to 70° C., even more preferably 30 to 50° C. The treatment time is preferably 1 to 20 hours, more preferably 2 to 10 hours, even more preferably 3 to 6 hours.

As an apparatus for the treatment with ozone and hydrogen peroxide, a common apparatus may be used. Examples include a common reactor having a reaction chamber, a stirrer, a chemical injector, a heater, and a pH electrode.

Performing the treatment with ozone and hydrogen peroxide immediately before the step B is preferred since residual ozone and hydrogen peroxide in the aqueous solution also act effectively in the defibration treatment in the step B, thus allowing the production of cellulose nanofibers that provide lower viscosity dispersion liquid.

It is inferred that the reason the treatment for reducing the viscosity of the oxidized cellulosic starting material can be efficiently performed using hydrogen peroxide and ozone is as follows: on the surface of the cellulosic starting material oxidized using an N-oxyl compound, carboxyl groups are localized and a hydrated layer is formed; hence, pieces of the starting material are present close to each other to form a network, which results in the high viscosity of a dispersion liquid containing the starting material; however, between the pieces of the starting material, microscopic spaces formed by the action of charge repulsive force between the carboxyl groups exist, which are not found in common pulp; when the starting material is treated with ozone and hydrogen peroxide, hydroxyl radicals which have superior oxidizability are generated from the ozone and the hydrogen peroxide, infiltrate the microscopic spaces and oxidize and decompose cellulose chains in the starting material efficiently, forming the starting material into short fibers.

(3) Hydrolysis with Acid

In this treatment, an acid is added to the oxidized cellulosic starting material to hydrolyze its cellulose chains (acid hydrolysis treatment). The acid that is preferably used is a mineral acid such as sulfuric acid, hydrochloric acid, nitric acid or phosphoric acid. As described above, to perform the reaction efficiently, it is preferable to use a dispersion liquid obtained by dispersing the oxidized cellulosic starting material in a dispersion medium such as water. The conditions for the acid hydrolysis treatment may be ones that allow the acid to act on the amorphous region of cellulose. For example, the amount of the acid added is preferably 0.01 to 0.5 mass %, more preferably 0.1 to 0.5 mass %, relative to the bone dry mass of the oxidized cellulosic starting material. Addition of the acid in an amount of 0.01 mass % or higher is preferred since hydrolysis of cellulose proceeds and the treatment efficiency in the step B improves. When the addition amount is 0.5 mass % or lower, it is possible to prevent the excessive hydrolysis of cellulose and a decrease in the yield of cellulose nanofibers. The pH of the reaction mixture during the acid hydrolysis is preferably 2.0 to 4.0, more preferably at least 2.0 to below 3.0. It is to be noted that when the alkali used in the step C-2 remains in the dispersion medium for the oxidized cellulosic starting material, it is preferable to adjust the pH of the system to a pH falling within the aforementioned range by increasing the addition amount of acid as appropriate. In terms of reaction efficiency, the reaction is preferably performed at a temperature of 70 to 120° C. for 1 to 10 hours.

To perform the treatment in the subsequent step B or C-2 efficiently, it is preferable to perform neutralization by adding an alkali such as sodium hydroxide after the acid hydrolysis treatment.

It is inferred that the reason the treatment for reducing the viscosity of the oxidized cellulosic starting material can be performed efficiently by the acid hydrolysis treatment is as follows: as described above, on the surface of the cellulosic starting material oxidized using an N-oxyl compound, carboxyl groups are localized, a hydrated layer is formed, and pieces of the starting material are present close to each other to form a network; when an acid is added to the starting material to perform hydrolysis, a charge balance in the network is lost, the robust network formed of cellulose molecules is broken up, the specific surface area of the starting material increases, the formation of the starting material into short fibers is promoted, and the viscosity of the cellulosic starting material is reduced.

2. Cellulose Nanofibers Produced in the Present Invention

The cellulose nanofibers produced in accordance with the present invention are single cellulose microfibrils having a width of about 2 to 5 nm and a length of about 1000 to 5000 nm, preferably a length of about 1 to 5 µm. As to the cellulose nanofibers obtained by the present invention, the B-type viscosity (60 rpm, 20° C.) in an aqueous dispersion having a concentration of 1.0% (w/v) is 1000 mPa·s or less, preferably 700 mPa·s or less, preferably 500 mPa·s or less, preferably 300 mPa·s or less, more preferably 100 mPa·s or less. The B-type viscosity in an aqueous dispersion having a concentration of 2% (w/v) is preferably 2000 mPa·s or less, more preferably 1000 mPa·s or less. When the B-type viscosity in an aqueous dispersion having a concentration of 2% (w/v) is 2000 mPa·s or less, superior miscibility with various pigments, binders, resins and the like is obtained. Further, when the B-type viscosity is 1000 mPa·s or less, a coating layer having at least a certain film thickness and superior surface nature can be obtained efficiently. The lower limit of the B-type viscosity is not particularly limited but is generally at least about 1 mPa·s or at least about 5 mPa·s. The B-type viscosity may be measured with a common B-type viscometer, and for example, TV-10 viscometer, which is a product of Toki Sangyo Co., Ltd., may be used to measure the B-type viscosity under the conditions of 20° C. and 60 rpm.

In accordance with the production method of the present invention, cellulose nanofibers can be well dispersed in a dispersion medium and hence, light diffusion is less likely to occur and a dispersion liquid of cellulose nanofibers obtained has high transparency. The dispersion medium in the dispersion liquid is preferably water. In the present invention, the transparency is evaluated based on the transmittance of light of wavelength 660 nm, and more specifically, the transparency is determined by using an ultraviolet and visible spectrophotometer to measure the amount of light transmitted through a specimen of quartz cell (light path: 10 mm) that contains a 0.1% dispersion liquid. As to the cellulose nanofibers obtained by the present invention, the light transmittance (wavelength 660 nm) in an aqueous dispersion having a concentration of 0.1% (w/v) is preferably 90% or higher, more preferably 94% or higher, even more preferably 95% or higher, yet even more preferably 97% or higher, still even more preferably 99% or higher. When the transparency is 95% or higher, the cellulose nanofibers can be used for general film applications and the like without any problems, and when the transparency is 99% or higher, the cellulose nanofibers can be used for film applications and the like which are required to have high optical properties (transparency) such as displays and touch panels, without any problems.

The amount of carboxyl groups in the cellulose nanofibers obtained by the present invention is preferably 1.2 mmol/g or more. The amount of carboxyl groups can be calculated through the following steps: preparing 60 ml of slurry (aqueous dispersion) containing 0.5 mass % of the cellulose nanofibers, adding thereto a 0.1M aqueous hydrochloric acid solution to adjust the pH to 2.5, then adding thereto a 0.05 N aqueous sodium hydroxide solution dropwise while measuring the electrical conductivity until the pH reaches 11, and calculating the amount of carboxyl groups on the basis of the amount of sodium hydroxide (a) which is consumed in the phase of neutralization of weak acid where the electrical conductivity changes gradually, by using the following formula:

Amount of carboxyl groups [mmol/g pulp]=a [ml]× 0.05/mass of cellulose nanofibers [g]

Since the cellulose nanofibers obtained by the present invention contain a large amount of carboxyl groups on the fiber surface, the fibers are less likely to aggregate and well dispersed in a dispersion medium. Hence, the cellulose nanofibers provide a highly transparent aqueous dispersion, as mentioned above.

It is preferred that the cellulose nanofibers produced in accordance with the present invention are less colored. Colored cellulose nanofibers have low strength in some cases. There is also the advantage that, for example, when a coating material containing less colored cellulose nanofibers is coated on a transparent film and dried, a transparent film having less appearance deficiency can be obtained owing to less tendency to change in color (coloration) caused by heat during the drying. Such cellulosic nanofibers can be obtained by, for example, using a cellulosic starting material having high brightness or using an oxidizing agent or a reducing agent in the step C-2, in particular, hydrogen peroxide as an oxidizing agent less likely to generate radicals.

Since the cellulose nanofibers produced in accordance with the present invention are superior in flowability and transparency and also superior in barrier property and heat resistance, they can be used for not only the applications mentioned above but also various applications such as packaging materials.

EXAMPLES

The present invention will be described in more detail below with reference to Examples, but the invention is not limited thereto.

Example 1

Step C-1: 20 g (bone dry weight) of unbeaten bleached softwood kraft pulp (brightness: 85%) was added into an aqueous sodium hydroxide solution having a hydroxide ion concentration of 2.5 mol/L so that the pulp concentration was adjusted to 10 mass %. The mixture was stirred at room temperature (20° C.) for 1 hour and then neutralized with an acid and washed with water.

Step A: 5 g (bone dry weight) of the pulp treated with alkali in the step C-1 mentioned above was added to 500 ml of an aqueous solution in which 94 mg (0.5 nmol) of TEMPO (Sigma Aldrich) and 755 mg (5 mmol) of sodium bromide were dissolved, and the mixture was stirred until the pulp was evenly dispersed. To the reaction mixture was added 18 ml of an aqueous sodium hypochlorite solution (effective chlorine: 5%), and then the pH was adjusted to 10.3 with a 0.5 N aqueous hydrochloric acid solution and oxidation reaction was initiated. While the pH of the reaction mixture decreased during the reaction, a 0.5 N aqueous sodium hydroxide solution was successively added to adjust the pH to 10. When sodium hypochlorite was consumed and the pH of the reaction mixture did not change any longer, the reaction was terminated. The mixture obtained after the reaction was passed through a glass filter to isolate pulp and the pulp was well washed with water to give oxidized pulp. The time required for the oxidation reaction was 85 minutes.

Viscosity-reducing treatment: 2 L of an aqueous dispersion containing the aforementioned oxidized pulp in a concentration of 1 mass % was prepared. The aqueous dispersion was irradiated with ultraviolet rays for 6 hours using a 20 W low-pressure ultraviolet lamp while leaving the dispersion to flow.

Step B: The aqueous dispersion subjected to the aforementioned viscosity-reducing treatment was treated 10 times with an ultrahigh pressure homogenizer (20° C., 140 MPa) to give a transparent gelatinous dispersion liquid.

The B-type viscosity (60 rpm, 20° C.) of the thus obtained aqueous dispersion of 1% (w/v) cellulose nanofibers was 896 mPa·s, which was measured with TV-10 viscometer (Told Sangyo Co., Ltd.) The 660-nm light transmittance (transparency) of an aqueous dispersion of 0.1% (w/v) cellulose nanofibers was 96.6%, which was measured with a UV-VIS spectrophotometer UV-265FS (Shimadzu Corporation). The amount of carboxyl groups in the obtained cellulose nanofibers was 1.93 mmol/g. The result is shown in Table 1.

Example 2

An aqueous dispersion of cellulose nanofibers was obtained and evaluated, in the same manner as in Example 1 except that the cellulosic starting material was changed to hardwood kraft pulp (brightness: 85%). The result is shown in Table 1.

Example 3

An aqueous dispersion of cellulose nanofibers was obtained and evaluated, in the same manner as in Example 1 except that the cellulosic starting material was changed to softwood sulfite pulp (brightness: 85%). The result is shown in Table 1.

Example 4

An aqueous dispersion of cellulose nanofibers was obtained and evaluated, in the same manner as in Example 1 except that the cellulosic starting material was changed to hardwood sulfite pulp (brightness: 85%). The result is shown in Table 1.

Example 5

An aqueous dispersion of cellulose nanofibers was obtained and evaluated, in the same manner as in Example 1 except that the aqueous sodium hydroxide solution in the step C-1 had a hydroxide ion concentration of 1.25 mol/L. The result is shown in Table 1.

Example 6

An aqueous dispersion of cellulose nanofibers was obtained and evaluated, in the same manner as in Example 1 except that the aqueous sodium hydroxide solution in the step C-1 had a hydroxide ion concentration of 3.25 mol/L. The result is shown in Table 1.

Example 7

An aqueous dispersion of cellulose nanofibers was obtained and evaluated, in the same manner as in Example 1 except that the aqueous sodium hydroxide solution in the step C-1 had a hydroxide ion concentration of 0.8 mol/L. The result is shown in Table 1.

Comparative Example 1

An aqueous dispersion of cellulose nanofibers was obtained and evaluated, in the same manner as in Example 1 except that the step C-1 was not performed. The result is shown in Table 1.

Comparative Example 2

An aqueous dispersion of cellulose nanofibers was obtained and evaluated, in the same manner as in Example 1 except that unbeaten hardwood bleached kraft pulp (brightness: 86%) was used and that the step C-1 was not performed. The result is shown in Table 1.

Comparative Example 3

An aqueous dispersion of cellulose nanofibers was obtained and evaluated, in the same manner as in Example 1 except that unbeaten softwood bleached sulfite pulp (brightness: 86%) was used and that the step C-1 was not performed. The result is shown in Table 1.

Comparative Example 4

An aqueous dispersion of cellulose nanofibers was obtained and evaluated, in the same manner as in Example 1 except that unbeaten hardwood bleached sulfite pulp (brightness: 87%) was used and that the step C-1 was not performed. The result is shown in Table 1.

Comparative Example 5

An aqueous dispersion of cellulose nanofibers was obtained and evaluated, in the same manner as in Example 1 except that the aqueous sodium hydroxide solution in the step C-1 had a hydroxide ion concentration of 0.5 mol/L. The result is shown in Table 1.

Comparative Example 6

The steps C-1 and A were performed in the same manner as in Example 1 except that the aqueous sodium hydroxide solution in the step C-1 had a hydroxide ion concentration of 5.0 mol/L. The time required for the oxidation reaction was 30 minutes; however, as the oxidation proceeded, the pulp was dissolved gradually, washing and collection became impossible, and neither oxidized pulp nor cellulose nanofiber was obtained. The result is shown in Table 1.

TABLE 1

| | Starting material | Alkali treatment (Step C-1) | OH concentration (mol/L) | Oxidation time (min) | Amount of carboxyl groups (mmol/g) | Aqueous dispersion of cellulose nanofibers Transparency (%) | B-type viscosity (mPa·s) |
|---|---|---|---|---|---|---|---|
| Ex. 1 | Softwood KP | ○ | 2.5 | 85 | 1.93 | 96.6 | 896 |
| Ex. 2 | Hardwood KP | ○ | 2.5 | 65 | 1.87 | 97.1 | 209 |
| Ex. 3 | Softwood SP | ○ | 2.5 | 65 | 1.82 | 96.4 | 926 |
| Ex. 4 | Hardwood SP | ○ | 2.5 | 40 | 1.75 | 96.0 | 665 |
| Ex. 5 | Softwood KP | ○ | 1.25 | 100 | 1.78 | 96.0 | 412 |
| Ex. 6 | Softwood KP | ○ | 3.25 | 30 | 2.34 | 96.2 | 172 |
| Ex. 7 | Softwood KP | ○ | 0.8 | 115 | 1.70 | 96.0 | 992 |
| Comp. Ex. 1 | Softwood KP | X | — | 120 | 1.67 | 95.9 | 3486 |
| Comp. Ex. 2 | Hardwood KP | X | — | 95 | 1.74 | 89.6 | 3218 |
| Comp. Ex. 3 | Softwood SP | X | — | 120 | 1.77 | 95.2 | 3508 |
| Comp. Ex. 4 | Hardwood SP | X | — | 120 | 1.65 | 92.8 | 3528 |
| Comp. Ex. 5 | Softwood KP | ○ | 0.5 | 120 | 1.70 | 95.7 | 3320 |
| Comp. Ex. 6 | Softwood KP | ○ | 5.0 | 20 | 1.76 | Production was impossible. | |

Comparison between the Examples and the Comparative Examples reveals that cellulose nanofibers that provide dispersion liquid having superior transparency and low viscosity can be produced efficiently in accordance with the present invention. In particular, comparison between Examples 1 and 5 to 7 and Comparative Examples 5 and 6 reveals that desired effects are produced by setting the hydroxide ion concentration in the step A at 0.75 to 3.75 mol/L.

Example 8

Step A: 5 g (bone dry weight) of unbeaten bleached softwood kraft pulp (Nippon Paper Industries Co., Ltd.; brightness: 84%) was added to 500 ml of an aqueous solution in which 78 mg (0.5 mmol) of TEMPO (Sigma Aldrich) and 755 mg (7 mmol) of sodium bromide were dissolved, and the mixture was stirred until the pulp was evenly dispersed. To the reaction mixture was added 18 ml of an aqueous sodium hypochlorite solution (effective chlorine: 5%), and then the pH was adjusted to 10.3 with a 0.5 N aqueous hydrochloric acid solution and oxidation reaction was initiated. While the pH of the reaction mixture decreased during the reaction, a 0.5 N aqueous sodium hydroxide solution was successively added to adjust the pH to 10. After the reaction was continued for 2 hours, the mixture was passed through a glass filter and washed well with water to give an oxidized cellulosic starting material.

Step C-2: An aqueous dispersion of the oxidized cellulosic starting material having a concentration of 5% (w/v) was prepared, hydrogen peroxide having a concentration of 1% (w/v) relative to the oxidized cellulosic starting material was added to the dispersion, and the pH was adjusted to 12 with a 1M sodium hydroxide. After the aqueous dispersion was heated at 80° C. for 2 hours to hydrolyze the oxidized cellulosic starting material, the dispersion was passed through a glass filter and washed well with water.

The coloration of the dispersion liquid of the oxidized cellulosic starting material obtained was visually evaluated based on the following criteria:
3 Not colored
2 Hardly colored
1 Colored Step B: An aqueous dispersion containing the cellulosic starting material obtained in the step C-2 in a concentration of 2% (w/v) was prepared and treated 10 times with an ultrahigh pressure homogenizer (treatment pressure: 140 MPa) to give a transparent gelatinous dispersion liquid.

The B-type viscosity (60 rpm, 20° C.) of the obtained aqueous dispersion of 2% (w/v) cellulose nanofibers was measured with TV-10 viscometer (Told Sangyo Co., Ltd.) Further, the obtained 2% (w/v) cellulose nanofiber dispersion liquid was diluted with water to prepare an aqueous dispersion of 0.1% (w/v) cellulose nanofibers, and the 660-nm light transmittance of the dispersion was measured with a UV-VIS spectrophotometer UV-265FS (Shimadzu Corporation). Furthermore, the amount of consumption of electric power required for defibration and dispersion treatments was determined by the formula: (electric power used during treatment)×(treatment time)/(amount of treated sample). The result is shown in Table 2.

Example 9

A nanofiber dispersion liquid was obtained and evaluated, in the same manner as in Example 8 except that sodium hypochlorite having a concentration of 1% (w/v) relative to the oxidized cellulosic starting material was added instead of hydrogen peroxide, in the step C-2. The result is shown in Table 2.

Example 10

A nanofiber dispersion liquid was obtained and evaluated, in the same manner as in Example 8 except that the treatment of the step C-2 was performed under a condition of pressurization with oxygen to 0.6 MPa. The result is shown in Table 2.

Example 11

A nanofiber dispersion liquid was obtained and evaluated, in the same manner as in Example 8 except that ozone having a concentration of 2% (w/v) relative to the oxidized cellulosic starting material was added in the step C-2. The result is shown in Table 2.

Example 12

A nanofiber dispersion liquid was obtained and evaluated, in the same manner as in Example 8 except that hydrogen peroxide was not added in the step C-2. The result is shown in Table 2.

Examples 13-15

Nanofiber dispersion liquids were obtained and evaluated, in the same manner as in Example 8 except that the pH were adjusted to 8, 10, and 14, respectively, with 1M sodium hydroxide when hydrogen peroxide was added in the step C-2. The results are shown in Table 2.

Examples 16-19

Nanofiber dispersion liquids were obtained and evaluated, in the same manner as in Example 8 except that the temperatures were 50, 60, 90, and 100° C., respectively, in the step C-2. The results are shown in Table 2.

Example 20

A nanofiber dispersion liquid was obtained and evaluated, in the same manner as in Example 8 except that, before the step B, a step was performed in which an aqueous dispersion containing the cellulosic starting material obtained in the step C-2 in a concentration of 2% (w/v) was prepared, followed by irradiating the aqueous dispersion with ultraviolet rays of 254 nm for 6 hours using a 20 W low-pressure ultraviolet lamp while leaving the aqueous dispersion to flow. The result is shown in Table 2.

Example 21

A nanofiber dispersion liquid was obtained and evaluated, in the same manner as in Example 8 except that unbeaten bleached hardwood kraft pulp (Nippon Paper Industries Co., Ltd.; brightness: 85%) was used instead of unbeaten bleached softwood kraft pulp. The result is shown in Table 3.

Example 22

A nanofiber dispersion liquid was obtained and evaluated, in the same manner as in Example 21 except that sodium hypochlorite having a concentration of 1% (w/v) relative to the oxidized pulp was added instead of hydrogen peroxide, in the step C-2. The result is shown in Table 3.

Example 23

A nanofiber dispersion liquid was obtained and evaluated, in the same manner as in Example 21 except that the treatment of the step C-2 was performed under a condition of pressurization with oxygen to 0.6 MPa. The result is shown in Table 3.

Example 24

A nanofiber dispersion liquid was obtained and evaluated, in the same manner as in Example 8 except that unbeaten bleached hardwood sulfite pulp (brightness: 86%) was used instead of unbeaten bleached softwood kraft pulp. The result is shown in Table 3.

Comparative Example 7

The oxidized cellulosic starting material obtained in the step A of Example 8 was used to prepare an aqueous dispersion having a concentration of 2% (w/v). The step C-2 was not performed, but a viscosity-reducing treatment was performed in which the aqueous dispersion was irradiated with ultraviolet rays of 254 nm for 6 hours using a 20 W low-pressure ultraviolet lamp while leaving the aqueous dispersion to flow. The aqueous dispersion obtained by this treatment was used to perform the step B of Example 8 and a nanofiber dispersion liquid was thus obtained and evaluated. The result is shown in Table 2.

Comparative Example 8

The oxidized cellulosic starting material obtained in the step A of Example 8 was used to prepare an aqueous dispersion having a concentration of 2% (w/v). The step C-2 was not performed, but commercially available cellulase (Novozyme 476 from Novozymes Japan) was added to the aqueous dispersion such that the amount of the added cellulase was 2 mass % relative to the oxidized cellulosic starting material, and the mixture was retained at 50° C. The aqueous dispersion obtained by this treatment was used to perform the step B of Example 8 and a nanofiber dispersion liquid was thus obtained and evaluated. The result is shown in Table 2.

Comparative Example 9

The oxidized cellulosic starting material obtained in the step A of Example 8 was used to prepare an aqueous dispersion having a concentration of 2% (w/v). The step C-2 was not performed, but a viscosity-reducing treatment was performed by adding ozone and hydrogen peroxide to the aqueous dispersion and stirring the mixture at room temperature for 6 hours. The amounts of the ozone and hydrogen peroxide used were set at an ozone concentration of 6 g/L (corresponding to 0.6 time greater than the bone dry mass of the oxidized cellulosic starting material) and a hydrogen peroxide concentration of 3 g/L (corresponding to 0.3 time greater than the bone dry mass of the oxidized cellulosic starting material), respectively. The aqueous dispersion obtained by this treatment was used to perform the step B of Example 8 and a nanofiber dispersion liquid was thus obtained and evaluated. The result is shown in Table 2.

Comparative Example 10

A 0.1 N aqueous hydrochloric acid solution was added to the oxidized cellulosic starting material obtained in the step A of Example 8 to prepare a 5% (w/v) aqueous dispersion of pH 2.8. The step C-2 was not performed, but the aqueous dispersion was stirred at 90° C. for 2 hours to perform an acid hydrolysis treatment. The amount of hydrochloric acid added was adjusted to 0.1 mass % relative to the oxidized cellulosic starting material. The aqueous dispersion obtained by this treatment was used to perform the step B of Example 8 and a nanofiber dispersion liquid was thus obtained and evaluated. The result is shown in Table 2.

TABLE 2

| | Starting material | Step C-2 Condition | Coloration | Viscosity-reducing treatment | Cellulose nanofiber dispersion liquid | | |
|---|---|---|---|---|---|---|---|
| | | | | | B-type viscosity* (mPa·s) | Transparency (%) | Electric consumption (kWh/kg) |
| Ex. 8 | Softwood KP | 1% H$_2$O$_2$ pH12 80° C. × 2 h | 3 | — | 1700 | 99.1 | 21 |
| Ex. 9 | Softwood KP | 1% NaClO pH12 80° C. × 2 h | 2 | — | 1688 | 98.7 | 21 |
| Ex. 10 | Softwood KP | 1% H$_2$O$_2$ pH12 80° C. × 2 h 0.6 MPa oxygen pressurization | 2 | — | 1850 | 98.6 | 23 |
| Ex. 11 | Softwood KP | 1% H$_2$O$_2$ 2% ozone pH12 80° C. × 2 h | 2 | — | 1695 | 99.0 | 22 |
| Ex. 12 | Softwood KP | pH12 80° C. × 2 h | 1 | — | 1725 | 95.3 | 22 |
| Ex. 13 | Softwood KP | 1% H$_2$O$_2$ pH8 80° C. × 2 h | 2 | — | 1986 | 99.0 | 23 |
| Ex. 14 | Softwood KP | 1% H$_2$O$_2$ pH10 80° C. × 2 h | 3 | — | 1836 | 99.2 | 22 |
| Ex. 15 | Softwood KP | 1% H$_2$O$_2$ pH14 80° C. × 2 h | 2 | — | 1540 | 99.3 | 20 |

TABLE 2-continued

|  | Starting material | Step C-2 Condition | Coloration | Viscosity-reducing treatment | Cellulose nanofiber dispersion liquid | | |
|---|---|---|---|---|---|---|---|
|  |  |  |  |  | B-type viscosity* (mPa·s) | Transparency (%) | Electric consumption (kWh/kg) |
| Ex. 16 | Softwood KP | 1% $H_2O_2$ pH12 50° C. × 2 h | 3 | — | 1922 | 98.3 | 24 |
| Ex. 17 | Softwood KP | 1% $H_2O_2$ pH12 60° C. × 2 h | 3 | — | 1822 | 98.6 | 23 |
| Ex. 18 | Softwood KP | 1% $H_2O_2$ pH12 90° C. × 2 h | 3 | — | 1603 | 99.5 | 20 |
| Ex. 19 | Softwood KP | 1% $H_2O_2$ pH12 100° C. × 2 h | 2 | — | 1487 | 99.2 | 19 |
| Ex. 20 | Softwood KP | 1% $H_2O_2$ pH12 80° C. × 2 h | 1 | 254 nm UV × 6 h | 1327 | 99.1 | 20 |
| Comp. Ex. 7 | Softwood KP | — | 1 | 254 nm UV × 6 h | 2939 | 98.2 | 27 |
| Comp. Ex. 8 | Softwood KP | — | 1 | Cellulase 2% | 2466 | 98.0 | 24 |
| Comp. Ex. 9 | Softwood KP | — | 1 | Ozone, $H_2O_2$ × 6 h | 2988 | 97.6 | 26 |
| Comp. Ex. 10 | Softwood KP | — | 1 | 0.1% HCl 90° C. × 2 h | 4078 | 97.8 | 32 |

*2% (w/v) aqueous dispersion

TABLE 3

|  | Starting material | Step C-2 Condition | Coloration | Viscosity-reducing treatment | Cellulose nanofiber dispersion liquid | | |
|---|---|---|---|---|---|---|---|
|  |  |  |  |  | B-type viscosity* (mPa·s) | Transparency (%) | Electric consumption (kWh/kg) |
| Ex. 21 | Hardwood KP | 1% $H_2O_2$ pH12 80° C. × 2 h | 3 | — | 430 | 97.0 | 16 |
| Ex. 22 | Hardwood KP | 1% NaClO pH12 80° C. × 2 h | 2 | — | 444 | 97.4 | 16 |
| Ex. 23 | Hardwood KP | 1% $H_2O_2$ pH12 80° C. × 2 h 0.6 MPa oxygen pressurization | 2 | — | 988 | 97.3 | 17 |
| Ex. 24 | Hardwood SP | 1% $H_2O_2$ pH12 80° C. × 2 h | 3 | — | 420 | 96.9 | 16 |

*2% (w/v) aqueous dispersion

The results shown in Tables 2 and 3 reveal the following: in Examples 8 to 24, in which the step C-2 for hydrolyzing the oxidized cellulosic starting material in an alkaline solution is performed, cellulose nanofibers that provide aqueous dispersion having low viscosity and high transparency can be produced with low electric consumption, as compared with Comparative Examples 7 to 10, in which the step C-2 is not performed.

The invention claimed is:
1. A method for producing cellulose nanofibers comprising the following steps:
   (A) oxidizing a cellulosic starting material in the presence of an N-oxyl compound (a1) and a compound selected from the group consisting of bromides, iodides and mixtures thereof (a2), using an oxidizing agent (a3) to prepare an oxidized cellulosic starting material; and
   (B) preparing a dispersion liquid in which the oxidized cellulosic starting material obtained in the step A, or hydrolyzed, oxidized cellulosic starting material obtained in step C-2 below, is dispersed in water and defibrating the oxidized cellulosic starting material while dispersing the oxidized cellulosic starting material in water, to convert the oxidized cellulosic starting material into cellulose nanofibers, wherein the nanofibers are dispersed in water, and have an average width of about 2 to 5 nm and an average length of about 100 to 5000 nm, and the method further comprising the following step:
   (C) performing a treatment under alkaline conditions, wherein the step C is at least one of the following steps:

(C-1) treating the cellulosic starting material in water having a hydroxide ion concentration of 0.75 to 3.75 mol/L before the step A; and (C-2) subjecting the oxidized cellulosic starting material obtained in the step A to hydrolysis in an alkaline solution having a pH between 8 and 14 after the step A and before the step B.

2. The method of claim 1, wherein at least the step C-2 is performed and an oxidizing agent or a reducing agent is added to the alkaline solution in the step C-2.

3. The method of claim 1, wherein at least the step C-2 is performed and the hydrolysis in the step C-2 is performed for 0.5 to 24 hours under a temperature condition of 40 to 120° C.

4. The method of claim 1, wherein at least the step C-2 is performed and a concentration of the oxidized cellulosic starting material used in the step C-2 in a reaction mixture is 1 to 50% (w/v).

5. The method of claim 1, wherein the cellulosic starting material is bleached kraft pulp or bleached sulfite pulp with a brightness of 80% or more according to ISO 2470.

6. The method of claim 1, wherein the cellulosic starting material is a hardwood cellulosic starting material.

* * * * *